(No Model.)  2 Sheets—Sheet 1.

J. H. HARE.
REVERSING GEAR.

No. 605,226. Patented June 7, 1898.

WITNESSES:
J. C. Shaw
Chas. E. Brock

INVENTOR
John H. Hare,
BY
O'Meara & Co.
ATTORNEYS

THE NORRIS PETERS CO., PHOTO-LITHO., WASHINGTON, D. C.

(No Model.)
2 Sheets—Sheet 2.
J. H. HARE.
REVERSING GEAR.
No. 605,226. Patented June 7, 1898.
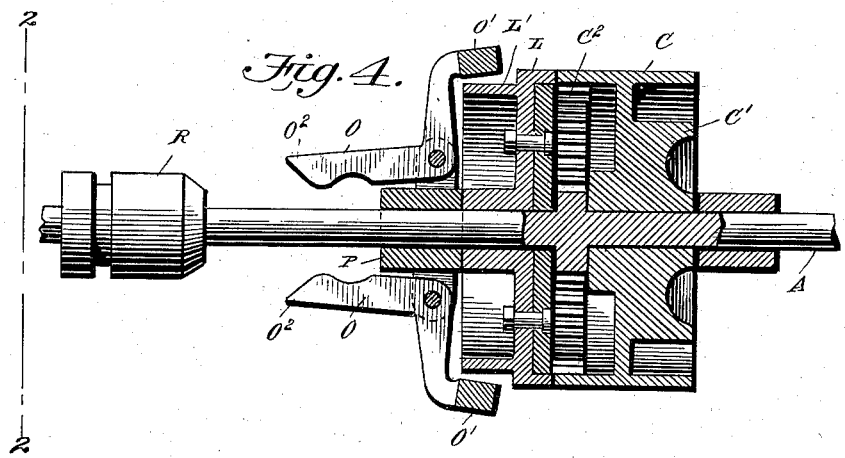
Fig. 4.
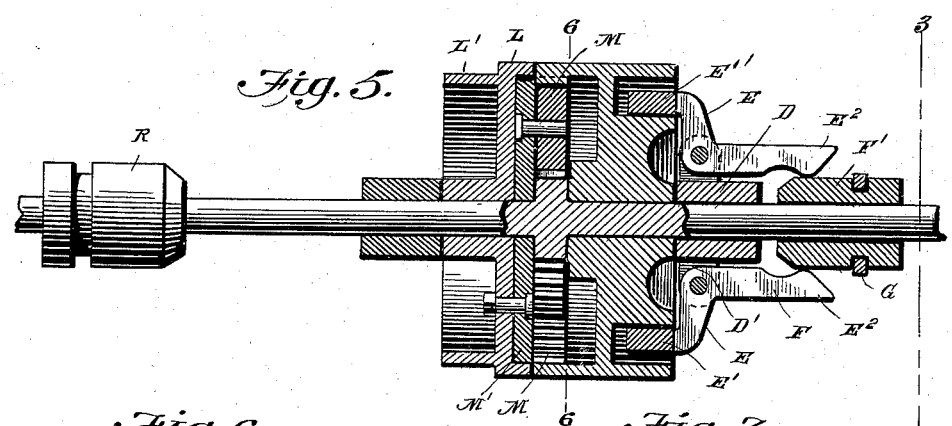
Fig. 5.
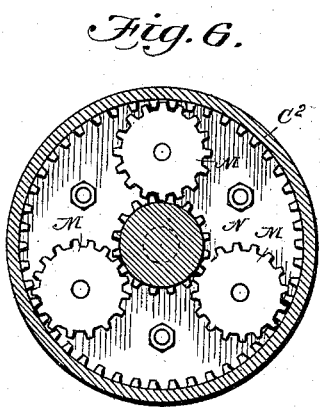
Fig. 6.
Fig. 9.
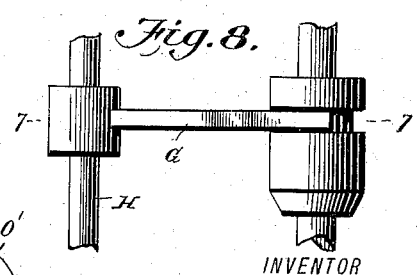
Fig. 7.
Fig. 8.
WITNESSES:
J. C. Shaw
Chas E. Brock
INVENTOR
John H. Hare,
BY
ATTORNEYS

UNITED STATES PATENT OFFICE.

JOHN H. HARE, OF NOBLESVILLE, INDIANA.

REVERSING-GEAR.

SPECIFICATION forming part of Letters Patent No. 605,226, dated June 7, 1898.

Application filed October 1, 1896. Serial No. 607,558. (No model.)

*To all whom it may concern:*

Be it known that I, JOHN H. HARE, residing at Noblesville, in the county of Hamilton and State of Indiana, have invented a new and useful Reversing-Gear, of which the following is a specification.

This invention is an improved means for reversing the motion of a rotary shaft and can therefore be properly denominated a "reversing-gear."

My invention is particularly applicable to the counter-shafts of lathes, sawmills, and similar appliances wherein an intermittent reverse rotary motion is required; but it will of course be understood that my invention can be applied to any device or machine wherein a reverse movement of a rotary shaft is required.

The object of my invention is to provide a reversing mechanism which shall be exceedingly cheap and simple and dispense with one or more belts and clutches commonly employed on all the reversing mechanisms of which I am aware.

Another object of my invention is to provide a reversing mechanism which can be quickly and easily applied to any of the devices or machines now in use and one which can be readily understood by the ordinary mechanic.

With these various objects in view my invention consists, essentially, of a pulley adapted to run loosely in one direction upon a shaft, said pulley having a friction-clutch at one side and an internally-toothed rim at the other side, a clutch mounted upon the shaft and adapted to engage the clutch upon the pulley, a pinion mounted also upon the shaft, and a plate mounted loosely upon the shaft and carrying a plurality of pinions which engage the internally-toothed rim and the pinion upon the shaft, said plate being held stationary or permitted to move with the pulley, as desired.

My invention consists also in certain details of construction and novelties of combination, all of which will be fully described hereinafter and pointed out in the claims.

Figure 1:
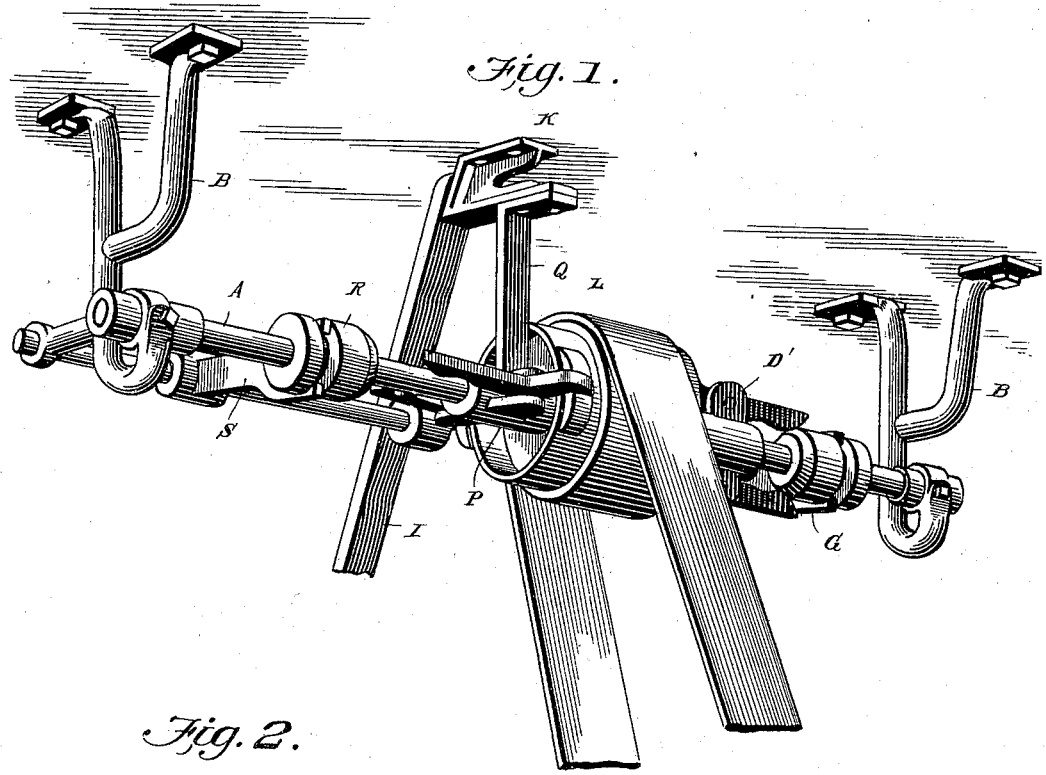
Figure 2:
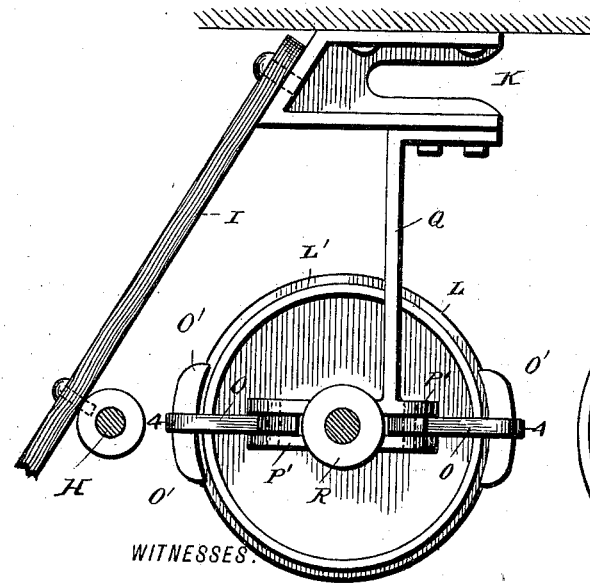
Figure 3:
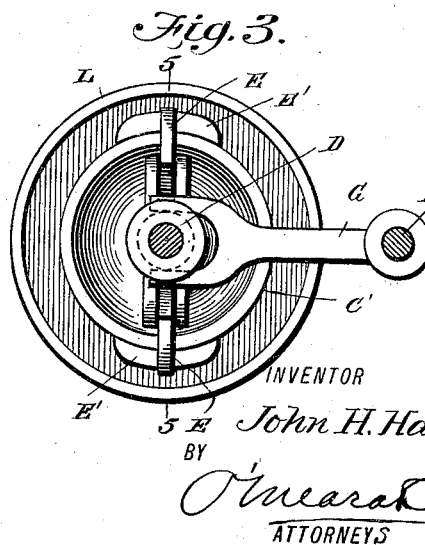

In the drawings forming a part of this specification, Figure 1 is a view showing the practical application of my invention. Fig. 2 is a section on the line 2 2 of Fig. 4. Fig. 3 is a sectional view on the line 3 3 of Fig. 5. Fig. 4 is a section on the line 4 4 of Fig. 2. Fig. 5 is a section on the line 5 5 of Fig. 3. Fig. 6 is a section on the line 6 6 of Fig. 5. Fig. 7 is a section on the line 7 7 of Fig. 8. Fig. 8 is a detail view of one of the shifting arms and sledge-collars. Fig. 9 is a detail view of one of the levers.

In the practical embodiment of my invention I employ a counter-shaft A, supported in suitable hangers B, and loosely mounted upon this shaft is a reversing-pulley C, said pulley having the hub portion enlarged at one side, as shown at C', and at the opposite side said pulley is formed with an internal-tooth rim $C^2$, which may be integral with the pulley C or attached thereto in any suitable manner.

A sleeve D is mounted upon the shaft A, said sleeve having ears D', between which are pivoted the elbow brake or clutch levers F, said levers carrying the shoes E', which are disposed to contact frictionally with the enlarged hub portion C', and for the purpose of bringing the shoes into contact with the hub I employ a sliding collar F', which engages the ends $E^2$ of the levers E and throws the brake-shoes into contact with the brake-hub C', and in order to slide the collar F' back and forth I employ the bifurcated arm G, rigidly connected to a shifting rod H, said rod being moved longitudinally by means of a shifting lever I, pivotally attached to a hanger-block K, secured to the ceiling in the present illustration. On the opposite side of the pulley and loosely mounted upon the shaft is a circular plate or disk L, which rests contiguous to the internal-tooth rim of the pulley, said disk or plate having an annular brake-flange L' upon the outer side, and upon the inner face of the said disk are mounted a series of pinions M, three being shown in the drawings, although it will of course be understood that any number may be employed, said pinions being adapted to mesh with a pinion N, rigidly mounted upon the counter-shaft A.

In the drawings I have shown the pinions M journaled to the plate M', which is secured to the inner face of the disk L, as most clearly shown in Figs. 4, 5, and 6; but it will of course be understood that these pinions can be journaled directly to the inner face of the plate or disk L, if so desired.

A collar or sleeve P is supported upon the shaft A by means of a bracket-arm Q, which depends from the hanger-block K, said sleeve P having the lugs or ears P', arranged at the side thereof and between which are pivoted the elbow shaft clutch or brake levers O, having the shoes O', adapted to contact frictionally with the annular brake-flange L', the outer ends O$^2$ of said levers being arranged for engagement with the sliding collar R, sliding upon the shaft A and operated by the bifurcated arm S, carried by the shifting bar H, said arms S and G being so arranged that when the collar F' is moved into engagement with the ends E$^2$ of the levers E the collar R will be moved out of engagement with the ends O$^2$ of the levers O, and vice versa.

In the practical operation of my invention the pulley C is constantly revolved in one direction and is loosely mounted upon the shaft A, as before described. When it is desired to impart a motion to the shaft similar to the motion of the pulley, the lever I is shifted so as to bring the collar F' into engagement with the levers E, thus causing the brake-shoes to contact frictionally with the hub C', and as soon as such engagement is effected the shaft is revolved in the direction of the pulley through the medium of such brake or clutch connection, it being of course understood that the sleeve D is operatively connected with the shaft A, and in this instance the circular plate or disk L, together with the pinions, revolve about the shaft together with the pulley. When, however, it is desired to reverse the motion of the said shaft, the lever I is reversed, drawing back the collar F' and throwing the collar R into engagement with the levers O, so that the shoes O' are applied to the brake-flange L' and the motion of the circular plate or disk is checked, and as the pulley is constantly revolving and is operated with the internally-toothed rim, which engages the pinions journaled upon the inner face of the said plate or disk, and as these pinions mesh with the pinion N, rigidly mounted upon the shaft, it is obvious that a reverse motion will be imparted to the shaft. When the lever is so shifted as to throw both collars out of engagement, the shaft will remain stationary, but the pulley will continue to revolve in the same direction as before.

It will thus be seen that I provide an exceedingly cheap and simple construction of reversing gear or mechanism which can be quickly and easily applied to any shaft or any desired piece of machinery and one that can be quickly and efficiently operated to perform all of its intended functions.

Having thus described my invention, what I claim as new, and desire to secure by Letters Patent, is—

1. The combination of the shaft A, the pulley C mounted to rotate thereon having enlarged hub C' on one side and internal gear-teeth C$^2$ on the other, the sleeve D on the shaft adjacent to the hub C', the elbow brake-levers E having the beveled outer ends, a sliding collar F' having a conical end to pass between said levers, brake-shoes E' on the opposite end of the levers engaging the hub C', the disk L mounted on the shaft provided with flanges L', the pinion N rigidly mounted on the shaft, the disk L provided with annular flanges L', the pinions M journaled on the disk L and meshing with the interior gear-teeth C$^2$ and the pinion N, the sleeve P, the elbow brake-levers O pivoted to sleeve P having their outer ends O$^2$ beveled and carrying brake-shoes O' to engage the flange L', and the sliding collar R on the shaft provided with tapered or conical end to engage between the ends O$^2$ of the levers O, substantially as described.

2. The combination with the shaft A, the pulley C mounted to rotate thereon having enlarged hub C' on one side and internal gear-teeth C$^2$ on the other, the sleeve D on the shaft adjacent to the hub C', the elbow brake-levers E having the beveled outer ends, a sliding collar F' having a conical end to pass between said levers, brake-shoes E' on the opposite end of the levers engaging the hub C', the disk L mounted on the shaft provided with flanges L', the pinion N rigidly mounted on the shaft, the disk L provided with annular flanges L', the pinions M journaled on the disk L and meshing with the interior gear-teeth C$^2$ and the pinion N, the sleeve P, the elbow brake-levers O pivoted to sleeve P having their outer ends O$^2$ beveled and carrying brake-shoes O' to engage the flange L', the sliding collar R on the shaft provided with tapered or conical end to engage between the ends O$^2$ of the levers O, the shifting rod H parallel with the shaft, the lever I pivoted to the shaft-hanger and attached to the rod H, and the bifurcated arms G and S whose forks operate in annular grooves in the sliding collars F' and R, substantially as described.

JOHN H. HARE.

Witnesses:
THOMAS BIRCH,
CLINT LENNEN.